(12) United States Patent
Le Cam et al.

(10) Patent No.: US 11,987,366 B2
(45) Date of Patent: May 21, 2024

(54) AIRCRAFT CABIN AIR MANAGEMENT SYSTEM

(71) Applicant: Collins Aerospace Ireland, Limited, Cork City (IE)

(72) Inventors: Mathieu Le Cam, Cobh (IE); Giovanni Franzini, Glanmire (IE); Tejaswinee Darure, Cork City (IE)

(73) Assignee: Collins Aerospace Ireland, Limited, Quay (IE)

( * ) Notice: Subject to any disclaimer, the term of this patent is extended or adjusted under 35 U.S.C. 154(b) by 51 days.

(21) Appl. No.: 17/540,063

(22) Filed: Dec. 1, 2021

(65) Prior Publication Data

US 2022/0194602 A1    Jun. 23, 2022

(30) Foreign Application Priority Data

Dec. 21, 2020   (EP) ..................................... 20216086

(51) Int. Cl.
| | |
|---|---|
| *B64D 13/08* | (2006.01) |
| *F24F 11/30* | (2018.01) |
| *F24F 11/63* | (2018.01) |
| *B64D 13/06* | (2006.01) |
| *F24F 110/10* | (2018.01) |
| *F24F 120/20* | (2018.01) |

(52) U.S. Cl.
CPC .............. *B64D 13/08* (2013.01); *F24F 11/30* (2018.01); *F24F 11/63* (2018.01); *B64D 2013/0655* (2013.01); *F24F 2110/10* (2018.01); *F24F 2120/20* (2018.01)

(58) Field of Classification Search
CPC ................. F24F 2120/20; B64D 13/08; B64D 2013/0655
See application file for complete search history.

(56) References Cited

U.S. PATENT DOCUMENTS

| | | | |
|---|---|---|---|
| 6,145,751 A | 11/2000 | Ahmed | |
| 9,617,005 B1 * | 4/2017 | Schiff | ..................... B64D 13/00 |
| 9,896,216 B2 | 2/2018 | Linert et al. | |
| 9,971,365 B2 | 5/2018 | Lee et al. | |
| 10,353,369 B2 | 7/2019 | Delgoshaei et al. | |

(Continued)

FOREIGN PATENT DOCUMENTS

| | | |
|---|---|---|
| CN | 111256307 A | 6/2020 |
| CN | 109229392 B | 7/2020 |

(Continued)

OTHER PUBLICATIONS

European Search Report completed May 14, 2021 for EP Application No. 2021608 6.7.

*Primary Examiner* — Jerry-Daryl Fletcher
*Assistant Examiner* — Daniel C Comings
(74) *Attorney, Agent, or Firm* — Suiter Swantz IP

(57) ABSTRACT

The present disclosure makes use of the fact that passengers have ways of adjusting the temperature in their immediate environment or indicating their level of comfort or discomfort and uses information about the passengers' use of the temperature control capabilities in their immediate environment and/or indications of their level of comfort/discomfort as an input to a controller of an environmental control system (ECS) to automatically adjust the ECS supply air temperature set point.

5 Claims, 2 Drawing Sheets

(56) References Cited

U.S. PATENT DOCUMENTS

| | | |
|---|---|---|
| 10,364,996 B2 | 7/2019 | Zhao et al. |
| 10,620,645 B2 * | 4/2020 | Clark ................. G05D 23/1934 |
| 10,794,604 B2 | 10/2020 | Endel et al. |
| 2007/0130970 A1 | 6/2007 | Schwan et al. |
| 2015/0097399 A1 | 4/2015 | Vue |
| 2017/0064067 A1 | 3/2017 | Hockenberry et al. |
| 2018/0134382 A1 | 5/2018 | Scholl et al. |
| 2019/0061957 A1 | 2/2019 | Nicks |
| 2019/0338974 A1 | 11/2019 | Turney et al. |
| 2020/0182499 A1 | 6/2020 | Xu et al. |
| 2020/0201271 A1 | 6/2020 | Xu et al. |
| 2020/0241492 A1 | 7/2020 | Buda et al. |
| 2021/0393843 A1 * | 12/2021 | Trent ......................... A61L 9/20 |

FOREIGN PATENT DOCUMENTS

| | | | |
|---|---|---|---|
| EP | 264750 A2 | 4/1988 | |
| EP | 2005138 A1 | 12/2008 | |
| WO | WO-2015130571 A1 * | 9/2015 | ............... B60Q 3/44 |

* cited by examiner

AIRCRAFT CABIN AIR MANAGEMENT SYSTEM

RELATED APPLICATION AND INCORPORATION BY REFERENCE

This nonprovisional application claims the benefit of European Patent Application No. 20216086.7 filed Dec. 21, 2020, the entirety of which is incorporated by reference herein.

TECHNICAL FIELD

The present disclosure is concerned with the control and management of aircraft cabin air, in particular with the control and management of aircraft cabin air conditioning.

BACKGROUND

Climate or environmental conditioning systems are used in spaces such as buildings and vehicles to ensure that the air in those spaces is clean, healthy and comfortable for people occupying those spaces. There are stringent requirements for the conditioning of air in aircraft cabins, to ensure that passengers have sufficient clean fresh air to breathe whilst in the aircraft and that the air temperature and pressure is safe and comfortable.

Most passenger aircraft have a central environmental control system, ECS, which provides continuous, fresh, filtered air to the cabin. The ECS is controlled centrally to keep the cabin air temperature within predetermined limits, based around a set point that has been deemed to be comfortable for the majority of passengers. Typically, passengers also have an individual air vent or blower in a panel above their seats to provide additional individual air flow. In some aircraft, some passengers e.g. in First Class or Business class parts of the cabin, may be provided with additional personal heating or cooling units in the area of their seat to allow more personalised adjustment of their environment. Systems have been developed to provide individual air control under passenger seats or incorporated in the passenger seat, and to make such control available to more passengers. Examples are described in e.g. European Patent Application No. 2005138.9 and European Patent Application No. 20461576.9.

The ECS in an aircraft is the most energy-demanding sub-system of the aircraft, consuming up to 75% of the non-propulsive power in the cruise phase of flight. This power, needed to pressurize the outside air to a level suitable for the cabin environment, corresponds to 3-5% of the total power produced by the aircraft engines. Designers are considering new systems that can reduce the fuel requirements of the ECS. Various ECS systems have been developed to improve efficiency, including e.g. systems that use a high rate of recirculated cabin air mixed with outside air or other methods to reduce the demands on the ECS and thus reduce fuel consumption.

Another way of reducing fuel consumption by the ECS that is currently being considered is to allow the cabin temperature to actually be higher than has conventionally been selected. A problem with this is that the common temperature set point may not be comfortable for all passengers. Whilst passengers with individual heating/cooling devices will be able to adjust their own environment, not all passengers will have this ability. Even where many passengers are able to individually control their own environment, the ECS will be set at a fixed temperature that is generally considered to be at a comfortable level for most passengers.

There is a desire to provide air conditioning and management systems for aircraft that further reduce the fuel consumption by the ECS whilst maintaining comfortable cabin conditions.

SUMMARY

According to one aspect of the disclosure, there is provided a cabin temperature control system comprising an environmental control system, ECS, configured to provide clean air to an aircraft cabin at a predetermined temperature based on a set point, the ECS configured to receive one or more inputs indicative of a passenger comfort level and to adjust the set point based on the one or more inputs.

The system is particularly advantageous in aircraft fitted with individual heating or cooling devices associated with individual passenger seats, particularly in-seat climate conditioning modules, but also heaters/fans located under or above seats, including blowers in the panel above the seat or the like. The system will, however, provide benefits with any other inputs indicative of passenger comfort.

According to another aspect, there is provided a method of controlling the air temperature in an aircraft cabin, whereby air is provided to the cabin from an environmental conditioning system, ECS, at a predetermined temperature based on a set point, and wherein the set point is adjusted based on one or more inputs to the ECS indicative of passenger comfort.

In an example, a set point controller determines the adjustment to the set point based on the one or more inputs to provide the adjusted set point to the ECS. The one or more inputs may be provided by one or more micro-climate conditioning modules in the aircraft cabin. These may be in-seat micro-climate conditioning modules and/or heating or cooling devices located under or above a passenger seat.

Preferred embodiments of the invention will now be described by way of example only, with reference to the accompanying drawings.

DETAILED DESCRIPTION

As discussed above, environmental control systems (ECS) for conditioning the air in the cabin of an aircraft, are designed to provide air at a temperature deemed to ensure passenger comfort. Designers also need to take into account, however, the fuel consumption of the ECS, which is providing air of the optimal temperature. The selected set point temperature for the cabin air provided by the ECS has to therefore be a compromise between an 'ideal' temperature for optimal passenger comfort and the associated fuel consumption. The selected set point will lie somewhere between the minimum and maximum permitted cabin temperature.

Even for an 'optimal' set point temperature, some passengers will require more heating or cooling in the environment of their seat. Providing passengers with individual so-called micro-climate conditioning modules in or around their seat will allow then to have some control over the air temperature around them. On a larger scale, if a number of passengers have this capability, it may be possible to set the set point of the ECS at a higher temperature that would normally be considered optimal for passenger comfort, thus requiring less cooling and, therefore, reducing fuel consumption by the ECS.

The present disclosure makes use of the fact that passengers have ways of adjusting the temperature in their immediate environment or indicating their level of comfort or discomfort, and uses information about the passengers' use of the temperature control capabilities in their immediate environment and/or indications of their level of comfort/discomfort as an input to a controller of the ECS to automatically adjust the ECS supply air temperature set point.

If, for example, few passengers are selecting additional cooling at their seats although they have the capability to do so, this can be an indication that the cabin temperature set point of the ECS could be increased, allowing the temperature in the cabin to be higher (and thus reducing fuel consumption) since the passengers are then able to use their local devices to provide additional cooling if needed.

Figure 1:
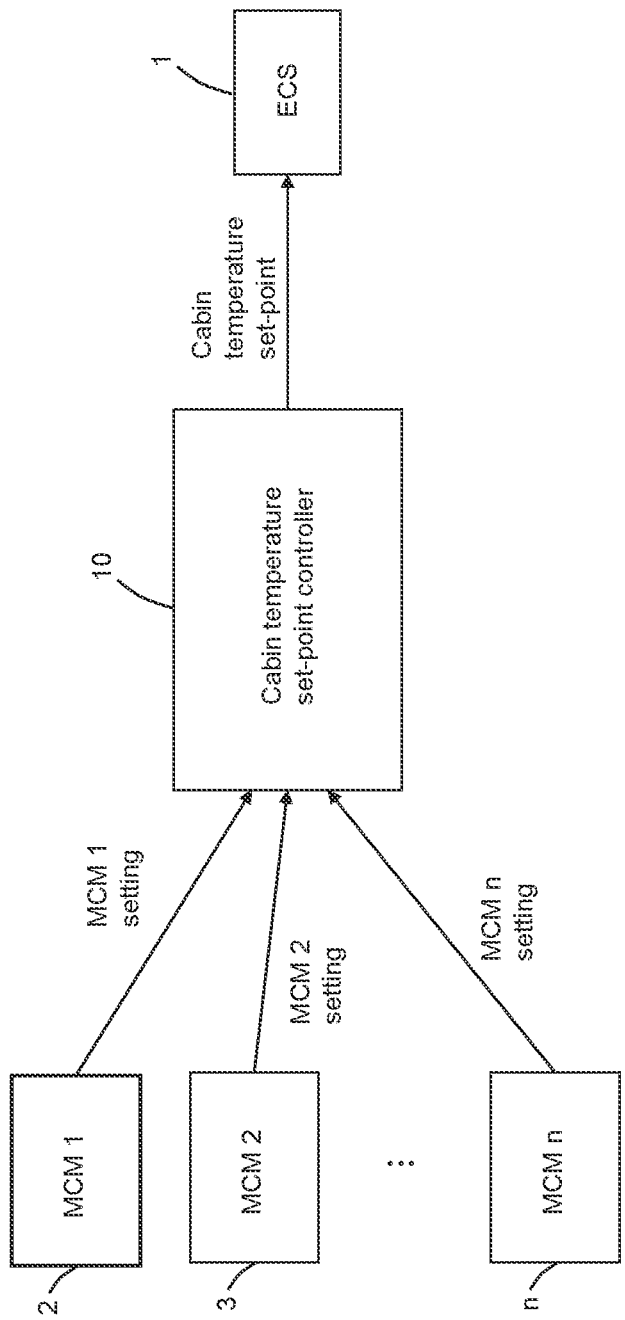
FIG. 1 is a simple schematic of an air temperature control system in an aircraft cabin.

FIG. 1 is a schematic view of an aircraft cabin air conditioning system having an ECS 1 for providing air to the cabin at a temperature according to a set point. In the example shown, the aircraft is also provided with a plurality of micro-climate conditioning modules 2, 3, n associated with individual seat areas. These may be in-seat micro-climate conditioning modules, but may also be provided under or above the seats. Such modules may be provided for each seat, or for several seats for example one per row, and may be provided in all areas of the cabin or only selected areas. Different seats or areas of the cabin could be provided with different types of conditioning modules. For example, some seats could be provided with in-seat modules, whereas others may only be provided with overhead blowers.

According to the disclosure, a set point controller 10 is provided to determine the set point for operation of the ECS 1. The set point controller 10 receives inputs from the micro-climate conditioning modules 2, 3, n and adjusts the set point of the ECS based on those inputs. It is also feasible that the controller 10 could be provided with other inputs indicative of passenger comfort or discomfort, for example, from passenger's own mobile telephones, or from switches or sensors in the aircraft that interact with the passengers, or from manual input by passengers and/or crew. Micro-climate conditioning modules add to the weight of an aircraft and the electric power use. These must be factored into the design and the effect of the additional weight and power consumption on fuel consumption must be taken into account. Smaller heat exchangers could be used in such modules to reduce weight and the associated fuel penalty in certain circumstances.

Figure 2:
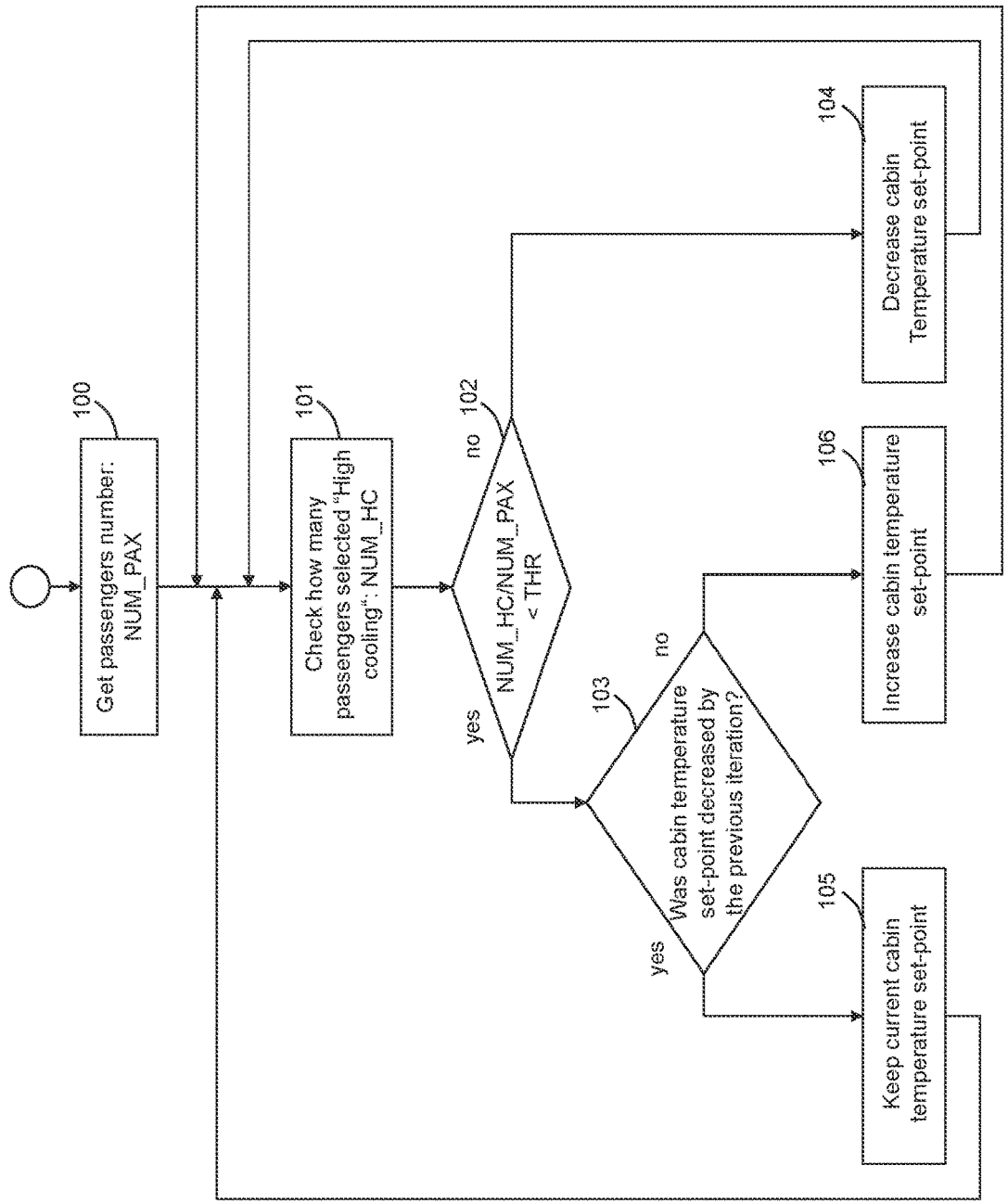
FIG. 2 is a flow diagram of cabin air control according to the present disclosure.

An example of the set point control methodology will now be described with reference to FIG. 2.

In this example, the system first determines the number of passengers NUM_PAX, at step 100. At step 101, the system determines the number of passengers that have set their micro-climate conditioning units 2, 3, n to a high cooling setting, NUM-HC. NUM-HC is divided by the number of passengers and then compared, at step 102 with a predetermined threshold THR.

If more than the threshold number of passengers have selected a high cooling setting ('no') this is an indication that the general cabin temperature is too high and the ECS set point is decreased, at step 104.

If the number of passengers that have selected a high cooling setting does not exceed the threshold THR, ('yes'), the system branches to step 103 where it is determined whether or not the set point was decreased in the previous cycle through the algorithm. If it was ('yes'), then the current set point is maintained (step 105). The set point has already been decreased and not too many people are using the high cooling setting so no further change is made. If, however, the set point had not been decreased in the previous cycle ('no' at 103), the cabin temperature set point of the ECS is increased (step 106). This is because the set point is providing air at a temperature that does not require additional cooling by many passengers—there is therefore scope to slightly increase the cabin temperature as there are still enough people with unused capacity to provide further cooling in their own environment. By increasing the set point, fuel savings can be made.

By only increasing the set point if during the previous cycle the set point had not been decreased, oscillations in set point selection are avoided. If the temperature was decreased in a previous cycle and then increased, it is likely that the passengers with the high cooling selection that triggered the first reduction would trigger a new decrease at the next cycle.

The methodology is performed in a loop that is executed periodically.

The threshold can be selected based on a range of factors including the type of aircraft, number of passengers, flight path, flight time, etc.

Step 101 in this example involves determining how many passengers have selected a high cooling setting at their seat. This is just one example of an input that is indicative of passenger comfort/discomfort. In general terms, this indicates how many passengers find the current settings suboptimal for their comfort. This can be indicated in different ways, as described above, depending on the types of conditioning modules or other input means available to the passengers. The inputs here can be of the same or different types.

The system of the present disclosure has the benefit of enabling reduced fuel consumption by the ECS since the set point can be increased without impacting the thermal comfort of the passengers and so the amount of ram air penalty and conditioning thereof is reduced.

The invention claimed is:

1. A cabin temperature control system comprising:
an environmental control system controller configured to supply clean air at a set temperature to an aircraft cabin;
a set point controller communicatively coupled to the controller; and
one or more micro-climate conditioners positioned in the aircraft cabin and communicatively coupled to the set point controller, each micro-climate conditioner configured to receive and supply the clean air to at least one seat positioned in the cabin, each micro-climate conditioner further configured to enter a temperature change request;
wherein the environmental controller, upon receiving temperature change requests from the one or more micro-climate conditioners through the set point controller, is further configured to:
decrease the set temperature upon receiving a number of decrease temperature change requests exceeding a predetermined threshold number of decrease temperature change requests; and
in an absence of the number of decrease temperature change requests received exceeding the predetermined threshold number of decrease temperature change requests, and if a previous change implemented by the environmental controller was not a decrease to the set temperature, increase the set temperature.

2. The system of claim 1, wherein the one or more micro-climate conditioners include one or more in-seat micro-climate conditioners.

3. The system of claim 1, wherein the one or more micro-climate conditioners include one or more heating or cooling devices located under a passenger seat.

4. The system of claim 1, wherein the one or more micro-climate conditioners include one or more heating or cooling devices located above a passenger seat.

5. A method of controlling air temperature in an aircraft cabin, comprising:
- providing an environmental controller in an aircraft configured to supply clean air at a set temperature to the aircraft cabin;
- providing a set point controller communicatively coupled to the environmental controller; and
- providing one or more micro-climate conditioners positioned in the aircraft cabin and communicatively coupled to the set point controller, each micro-climate conditioner configured to receive and supply the clean air to at least one seat positioned in the aircraft cabin, each micro-climate conditioner further configured to enter a temperature change request;

wherein the environmental controller, upon receiving temperature change requests from the one or more micro-climate conditioners through the set point controller, is further configured to:
- decrease the set temperature upon receiving a number of decrease temperature change requests exceeding a predetermined threshold number of decrease temperature change requests; and
- in an absence of the number of decrease temperature change requests received exceeding the predetermined threshold number of decrease temperature change requests, and if a previous change implemented by the environmental controller was not a decrease to the set temperature, increase the set temperature.

* * * * *